United States Patent [19]

Hamilton et al.

[11] Patent Number: 5,226,561

[45] Date of Patent: Jul. 13, 1993

[54] PROJECTILE FOR INITIATING INFLATION OF A MOTOR VEHICLE INFLATABLE SAFETY SYSTEM

[75] Inventors: Brian K. Hamilton, Littleton; Brent A. Parks, Englewood, both of Colo.

[73] Assignee: OEA, Inc., Aurora, Colo.

[21] Appl. No.: 663,264

[22] Filed: Mar. 1, 1991

[51] Int. Cl.$^5$ ............................................. B67D 5/00
[52] U.S. Cl. ...................................... 222/5; 222/1;
280/737; 102/501; 137/68.2; 441/93
[58] Field of Search .................... 222/5, 80, 81, 82, 1;
280/737, 736, 741, 742; 102/530, 501, 507;
137/68.2; 441/92, 93

[56] References Cited

U.S. PATENT DOCUMENTS

| | | | |
|---|---|---|---|
| 2,672,144 | 3/1954 | Cohen | 222/80 |
| 2,733,836 | 2/1956 | Switzer | 222/82 |
| 2,944,268 | 7/1960 | Fruendt | 222/5 |
| 3,477,740 | 11/1969 | Hass | 280/150 |
| 3,567,245 | 3/1971 | Ekstrom | 280/150 |
| 3,618,980 | 11/1971 | Leising et al. | 280/150 |
| 3,648,898 | 3/1972 | Day | 222/5 |
| 3,653,684 | 4/1972 | Plumer | 222/5 X |
| 3,690,695 | 9/1972 | Jones, Sr. | 222/5 X |
| 3,756,621 | 9/1973 | Lewis et al. | 280/150 |
| 3,773,353 | 11/1973 | Trowbridge et al. | 280/150 |
| 3,774,807 | 11/1973 | Keathley et al. | 222/3 |
| 3,788,667 | 1/1974 | Vancil | 280/150 |
| 3,822,895 | 7/1974 | Ochiai | 280/150 |
| 3,836,170 | 9/1974 | Grosch et al. | 280/150 |
| 3,869,143 | 3/1975 | Merrell | 280/150 |
| 3,877,381 | 4/1975 | McCoy | 102/501 |
| 3,887,108 | 6/1975 | McDaniel et al. | 222/5 X |
| 3,900,211 | 8/1975 | Russell et al. | 280/150 |
| 3,910,596 | 10/1975 | Wulbrecht et al. | 222/5 |
| 3,938,704 | 2/1976 | Milgram | 222/5 |
| 3,948,540 | 4/1976 | Meacham | 222/5 X |
| 3,966,226 | 6/1976 | Roth | 222/5 X |
| 4,046,156 | 9/1977 | Cook | 222/5 X |
| 4,114,924 | 9/1978 | Kasagi et al. | 280/740 |
| 4,289,327 | 9/1981 | Okada | 280/737 |
| 4,572,077 | 2/1986 | Antoine et al. | 102/501 X |
| 5,078,422 | 1/1992 | Hamilton et al. | 280/736 |

FOREIGN PATENT DOCUMENTS

| | | |
|---|---|---|
| 967192 | 5/1975 | Canada . |
| 2154460 | 5/1972 | Fed. Rep. of Germany . |
| 1095100 | 5/1955 | France . |
| 1147005 | 11/1957 | France . |
| 1506375 | 11/1967 | France . |
| 2185767 | 4/1974 | France . |
| 2502729 | 10/1982 | France . |
| 2543658 | 10/1984 | France . |
| 2557251 | 6/1985 | France . |
| 711630 | 7/1954 | United Kingdom .................. 222/81 |
| 823829 | 11/1959 | United Kingdom .................... 222/5 |
| 1256116 | 12/1971 | United Kingdom . |

Primary Examiner—Andres Kashnikow
Assistant Examiner—A. Pomrening
Attorney, Agent, or Firm—Sheridan, Ross & McIntosh

[57] ABSTRACT

A projectile for releasing a gas or other suitable fluid to initiate operation of an inflator in a motor vehicle inflatable safety system. In one embodiment, the projectile has a plurality of intersecting, concave, and inclined faces which taper to a point at the tip of the projectile. This projectile is positioned on the convex side of a dome-shaped disk which isolates the inflator from an expandable confinement. When a condition is detected requiring operation of the inflator, the projectile is freely propelled toward the disk to controllably separate the disk along lines coinciding with the edges defined by the intersecting faces of the projectile to reduce the potential for portions thereof breaking or tearing off and entering the flow from the inflator to the confinement.

45 Claims, 8 Drawing Sheets

PROJECTILE FOR INITIATING INFLATION OF A MOTOR VEHICLE INFLATABLE SAFETY SYSTEM

FIELD OF THE INVENTION

This invention generally relates to the field of motor vehicle inflatable safety systems and, more particularly, to such systems which initiate inflation by using a projectile to separate an isolating barrier in a controlled manner and create a flow path from an inflator to an inflatable confinement.

BACKGROUND OF THE INVENTION

Inflatable safety systems for motor vehicles have undergone significant development efforts in recent years due in part to an increased awareness as to their effectiveness. These inflatable safety systems are typically activated upon receipt of a signal from an appropriate detector or sensor which indicates that inflation of the confinement is required. A variety of inflators are used by these systems to expand the confinement in a manner which provides certain advantages. Many systems initiate inflation by "removing" an isolation between the confinement and the inflator. Thereafter, some inflating medium, whether it be pressurized gases, gases generated by combustion of a propellant, a mixture thereof, or other suitable fluids, is supplied to the confinement.

A portion of the development efforts for inflatable safety systems have concentrated upon or at least addressed controlling the flow from the inflator to the confinement after inflation has been initiated. In order to provide a reliable inflatable safety system, not only must there be a sufficient flow of the inflating medium to the confinement in a timely manner, but the confinement itself must remain structurally intact throughout operation. One proposed alternative for achieving these two fundamental objectives concentrates on the material selection for various components of the inflator.

U.S. Pat. No. 3,567,245 to Ekstrom, issued Mar. 2, 1971, discloses utilizing certain materials for the barrier which provides the initial isolation between the inflator and the confinement. In one embodiment, the isolating barrier is a friable or fragmentable material which is disintegrated or comminuted by the activation of an explosive device positioned therewithin to initiate inflation. The resultant materials, which are apparently of a sufficiently small size, are then forced through various passageways by the exiting pressurized fluid used for inflation and thus presumably enter the confinement. The utilization of an elastomeric material, particularly an RTV rubber, in this type of configuration is also suggested since the resultant materials allegedly do not damage the confinement due to their resiliency. Another embodiment includes an isolating barrier having preformed grooves thereon such that when the explosive device is activated, the barrier breaks into sections defined by the grooves. These resultant sections are able to pass through the passageways so as to not block the flow of fluid to the confinement, and thus also presumably enter the confinement.

U.S. Pat. No. 3,900,211 to Russell et al., issued Aug. 19, 1975, discloses selecting an appropriate material for the component used to release a poppet to initiate inflation. Generally, a poppet is positioned in a discharge conduit connected to a source of pressurized fluid to initially prohibit flow therefrom. A support tube assists in maintaining the poppet in this closed position and also separates the poppet from a pyrotechnic charge. Upon receiving a signal that inflation is required, the pyrotechnic charge is activated to disintegrate the supporting structure. The pressure exerted on the face of the poppet by the stored fluid thereafter moves the poppet to expose a discharge outlet to initiate the flow. Due to the positioning of the support tube between the poppet and the pyrotechnic charge and the travel of the poppet toward the charge after the activation thereof, the disclosure indicates that there is no expulsion of support tube or pyrotechnic residue in the fluid stream.

In recognition that fragments or other foreign materials generated upon activation of the inflator may enter into the flow and adversely affect the overall performance of the inflatable safety system, such as by restricting the flow rate through blocking passageways to the confinement or by damaging the confinement when propelled against the interior surfaces thereof, filtering-type devices were incorporated to remove these fragments and other foreign materials. U.S. Pat. Nos. 3,618,980 to Leising et al., issued Nov. 9, 1971; U.S. Pat. No. 3,822,895 to Ochiai, issued Jul. 9, 1974; and U.S. Pat. No. 4,114,924 to Kasagi et al., issued Sep. 19, 1978, are representative of these efforts. Leising et al. discloses in one embodiment the positioning of a vane structure between a propellant chamber and an inflatable bag. When a collision is sensed and the propellant within the propellant chamber is ignited, the by-products thereof flow through the vane structure. Heavier particles are thrust outwardly by the vanes and are directed to a trap where they are retained until converted into a gas or until the bag is inflated. However, the gases generated by the burning of the propellant flow to the confinement. In another embodiment, a screen structure is used to prevent molten liquid masses of propellant from entering into the inflatable bag while allowing gases to pass through alternate passageways.

Ochiai discloses a filtering apparatus positioned in the discharge area of a receptacle containing a source of an inflating gas. A cup-shaped barrier, having a convex side which faces the stored gas and a concave side which contains a rupture inducing means, initially contains the gas within the receptacle. When the cup-shaped barrier is ruptured, gas flows through the filter and to the gas bag. However, the broken pieces of the cup-shaped barrier are prevented from entering the gas bag by the filter.

Kasagi et al. discloses positioning a collecting chamber between an inflator and an inflatable safety bag to collect fragments or pieces generated by the removal of the initial isolating structure between the inflator and the inflatable bag. More particularly, the collecting chamber is positioned near a bent portion (illustrated as a 90° bend) of the conduit connecting the inflator and bag in substantial alignment with the conduit prior to making the bend. Consequently, as the gas and any fragments generated by removal of the isolating barrier approach the collecting chamber, the inertial forces possessed by the heavier fragments direct them to continue into the aligned collecting chamber where they are trapped while the gases flow around the bend in the conduit and are directed to the inflatable bag. Various other embodiments address structural modifications of the collecting chamber and/or the conduit, as well as the positioning of certain collecting materials within the collecting chamber.

The above-described filtering-type devices for controlling flow from the inflator to the confinement suffer from a number of deficiencies. For instance, filtering or collecting devices may not retain all of the particles generated upon activation of the inflator. Consequently, some particles may pass through the filtering device and become lodged in a passageway to restrict the flow to the confinement or some may enter the confinement, both of which may adversely affect performance of the inflatable safety system. Even if the filtering device properly functions and retains all of the generated particles, this may in and of itself introduce a further flow restriction to the confinement by blocking an entire passageway or a portion thereof. Furthermore, these filtering-type devices also add to the material and subsequent maintenance costs of the inflator.

As a result of the above deficiencies with systems which address controlling flow by concentrating on the by-products generated by the removal of the isolation between the inflator and the confinement, recent efforts have begun to utilize methods of initiating inflation which reduce the quantity of activation by-products. One possible alternative is the use of a projectile to "remove" the isolating member.

Representative of punching-type projectiles include U S. Pat. Nos. 3,788,667 to Vancil, issued Jan. 29, 1974, and U.S. Pat. No. 3,869,143 to Merrell, issued Mar. 4, 1975, which generally disclose the use of a ramming, piston-like member to remove a barrier isolating the inflator from the confinement after an appropriate signal is received by the respective activating apparatus. These barriers have grooves formed thereon to provide predetermined break lines such that when the ramming member impacts the barrier, the barrier is completely removed from its supporting structure to initiate inflation.

French Patent No. 2,557,251, issued Jun. 28, 1985, discloses releasing a fluid under pressure by using a projectile. More particularly, a plurality of metal particles (i.e., lead shot) are directed to and "burst" a cup-shaped diaphragm to release the pressurized fluid. Not only does there not appear to be a mechanism for trapping the lead shot after having been fired (i.e., the lead shot may restrict flow by collecting in a passageway and/or may enter the confinement to which the source is connected), but it does not appear that the referenced "bursting" of the disk by the disclosure would indicate any desire to reduce the amount of byproducts generated upon activation.

U.S. Pat. No. 3,836,170 to Grosch et al., issued Sep. 17, 1974, generally discloses a variety of projectiles for initiating inflation. In one embodiment, a piston-like ramming member is used to remove the isolating barrier which has rupture lines placed thereon and is therefore similar to that disclosed by Vancil and Merrell discussed above. In another embodiment, a cylindrically-shaped projectile positioned in a tubular guide is directed toward the isolating barrier by the activation of a pyrotechnic charge. A trap positioned beyond the barrier collects the projectile, the by-products of the activation of the pyrotechnic charge, and presumably portions of the isolating barrier, all of which allegedly do not impede the flow of gas through the plurality of exiting passageways. Another embodiment utilizes a blunt nosed projectile (i.e., one which tapers to a degree but not to a point) and an isolating barrier which appears from the drawings to be dished out on the downstream side of the projectile which is exposed to a portion of the source of compressed gas. When the blunt-nosed projectile impacts the dished out barrier on its substantially planar side, the barrier is allegedly torn in a star-shaped manner and the projectile and other by-products of activation are caught in a trap so that the flow of gas is not impeded. Although the blunt-nosed projectile embodiment is alleged to produce a star-shaped tear in the isolating barrier, this particular design would not produce a consistent tear-pattern on the barrier. Initially, it would appear that a portion of the barrier, coinciding essentially with the area of the blunt-nosed face of the projectile, would be "punched out" by the impact of the projectile and become completely separated from other portions of the barrier. However, assuming no punched out portion is produced, the potential for portions of the barrier breaking off and entering the flow still exists. Although thee is no explicit disclosure as to the type of surface forming the tapered portion of the projectile, it appears from the drawings that this surface is smooth. Consequently, this surface would not cut or otherwise separate the barrier in a predetermined manner as it passed therethrough, but instead the barrier would tear along lines dictated, in part, by the stresses in the barrier.

As a general rule of manufacturing processes, the thickness of a piece of metal stock determines, in part, the radius of a bend which may be formed without cracking or shearing the stock in the region of the bend. When the radius of a bend in a piece of stock becomes less than the initial thickness thereof, the potential for the development of cracks in the bend or the shearing of the stock in this region increases. Consequently, when it is desirable to achieve a cutting action in this region, the stock may be "bent" at a radius which is less than the thickness thereof, and preferably at a radius which is significantly less than the thickness to ensure shearing or cutting takes place in this region.

Assuming that the blunt-nosed projectile configuration of Grosch et al. would not completely punch out any portion of the isolating barrier, the smooth surface over the tapered portion of the projectile would, based upon the foregoing, bend versus cut the barrier as it passed therethrough since there is no disclosed "edge" which would cause a controlled cut or shear (i.e., the radius of the tapered surface is not, from the drawings, less than the thickness of the isolating barrier). The resultant bending of the barrier by the penetrating projectile would therefore cause the barrier to "tear" along lines dependent upon, in part, the existing stresses in the barrier. Therefore, the separation of the barrier by the blunt-nosed projectile configuration of Grosch et al. is not controlled (i.e., the pattern for the tearing will typically vary dependent upon various factors), thereby creating the potential for separating the barrier in a manner which would result in portions thereof breaking off and entering the flow.

French Patent Nos. 1,147,005, issued Nov. 18, 1957, and 2,543,658, issued Oct. 5, 1984, each generally disclose a projectile for releasing a pressurized fluid from a container. The disclosed projectiles taper to a point and appear to be continuously smooth over the entire tapered surface. The apparent smoothness of the tapered portions of the projectile would also produce inconsistent and uncontrolled results in "removing" or separating a barrier as discussed above due to the resultant bending of the barrier (based upon the radius of the tapered portion) and subsequent uncontrolled "tearing" of the barrier along lines dependent, in part, upon the stresses therewithin. In fact, French Patent No. 2,543,658 discloses that the projectile utilized therein actually "shatters" the isolation which would generate and introduce numerous particles into the system, and thus does not even recognize the desirability of controlling the amount of byproducts generated by separation of the barrier.

Canadian Patent No. 967,192, issued May 6, 1975, discloses another projectile head design for releasing a compressed gas. A spring loaded plunger extends through a bottle of compressed gas. When a collision is sensed, the plunger is driven through the diaphragm which isolates the compressed gas from the inflatable member to release the gas. The end of the plunger appears to have a series of unjoined (i.e., non-intersecting), inclined planar surfaces which, although tapered, do not appear to taper to a point. The resultant projectile is thus of the blunt-nosed configuration utilized by Grosch et al. which suffers from the above-noted deficiencies. Moreover, it is not apparent from the drawings and the disclosure does not appear to indicate that this projectile head configuration would cut an isolating member in a consistent manner to reduce fragmentation. Since the inclined faces of the projectile do not intersect, the edges formed by the inclined faces would bend versus cut the barrier, due to the radius of the edge in relation to the diaphragm, resulting in the type of inconsistent and uncontrolled "tearing" of the diaphragm as addressed above.

SUMMARY OF THE INVENTION

The present invention releases gases or other fluids in a manner which does not result in any significant amount of foreign materials entering the flow from the source of such gases or fluids. In one embodiment, the present invention includes a housing having a source of gas or other appropriate fluid, a barrier to initially contain the gas within the housing, and a projectile positioned on one side of the barrier. When release of the gas is desired, the projectile is propelled toward the barrier to penetrate, pass through, and separate the barrier in a controlled manner which creates a path for the flow of gas from the housing. Due to the controlled separation of the barrier, the barrier remains substantially intact after being penetrated by the projectile which reduces the potential for the generation of fragments or other foreign materials. Consequently, the potential for a restricted flow due to collection of debris in passageways connecting the source of gas and the article to receive the gas, as well as the potential for such debris actually entering the article, is significantly reduced. Therefore, the present invention is particularly useful in inflatable safety systems for motor vehicles.

The configuration of the projectile contributes to the performance of the present invention, namely by controlling the separation of the barrier. One embodiment of the projectile utilizes a plurality of inclined, intersecting faces which converge to substantially a point at the tip of the projectile. The pointed tip of the projectile effectively penetrates the barrier and the intersection of the adjacent faces produces a plurality of edges which, as the projectile passes through the barrier, cut the barrier along lines defined by these edges. In order to further enhance the definition of these edges to obtain a more effective cutting action, which further improves the controlled separation of the barrier, the faces of the projectile in another embodiment are concavely-shaped to effectively "raise" the edges to a sharper degree.

The effective result of the above-described configuration of the projectile is that the barrier is separated into a number of substantially triangularly-shaped petals coinciding with the number of faces and edges possessed by the projectile. These individual petals each remain attached to the perimeter of the barrier and point in the direction of the flow. Consequently, the barrier is separated in a controlled manner by the described cutting action of the projectile to produce an end configuration for the barrier which reduces the potential for portions thereof breaking off and entering the flow.

The configuration of the barrier itself also contributes to the performance of the present invention. In one embodiment, the barrier is a dome-shaped disk having a concave and convex side. Preferably, the concave side is exposed to the pressurized gas which is therefore exerting forces thereon, while the convex side faces the projectile. This configuration is advantageous in that when the projectile initially contacts the convex portion of the disk in its central region, the disk is dimpled which increases the stresses in the disk. Consequently, as the projectile penetrates the disk and the above-defined edges of the projectile initiate the separation lines thereon by the described cutting action, the disk stresses introduced by the dimpling, as well as the forces exerted on the concave side of the disk by the pressurized gas, assist in the separation of disk along lines defined by the edges of the projectile.

Based upon the foregoing, it can be appreciated that the present invention is particularly useful with inflatable safety systems for motor vehicles which generally consist of some type of inflator and an expandable confinement. In this regard, the projectile is suitably attached to a squib or other similar electroexplosive device which is commonly connected to a collision, impact, or deceleration detector. When an appropriate signal is received by the squib, the projectile is propelled through the barrier to yield the above-described results. Thereafter, the inflator supplies the gas or another fluid to the confinement by a variety of methods. The flow of gas thus provided to the confinement is essentially free from debris which could potentially adversely affect the performance of the inflatable safety system.

The present invention offers a number of advantages not previously provided for by known gas release mechanisms for inflatable safety systems. For instance, the present invention concentrates on reducing the materials generated in releasing the gas. Consequently, the need for additional and sometimes complex connectors between the inflator and the confinement is eliminated. Relatedly, the need for additional components such as filters, which may not effectively remove all particles and which may also become plugged to further adversely affect the performance of the inflator, is also eliminated. By choosing an appropriate number of inclined faces and thus cutting edges for the projectile, the present invention consistently releases a gas without generating an amount of fragments which could adversely affect the performance of the inflator and/or the inflatable confinement.

DETAILED DESCRIPTION OF THE INVENTION

The present invention will be described with reference to the accompanying drawings which illustrate the pertinent features thereof. Generally, the present invention is an apparatus which releases gases or other fluids from a container without introducing any significant amount of fragments or other debris into the flow from the container. Although the present invention may be used in all applications where it is desirable to release any source of gas or other fluid, the fragmentation reduction feature of the present invention makes it particularly useful in motor vehicle inflatable safety systems.

Figure 1:
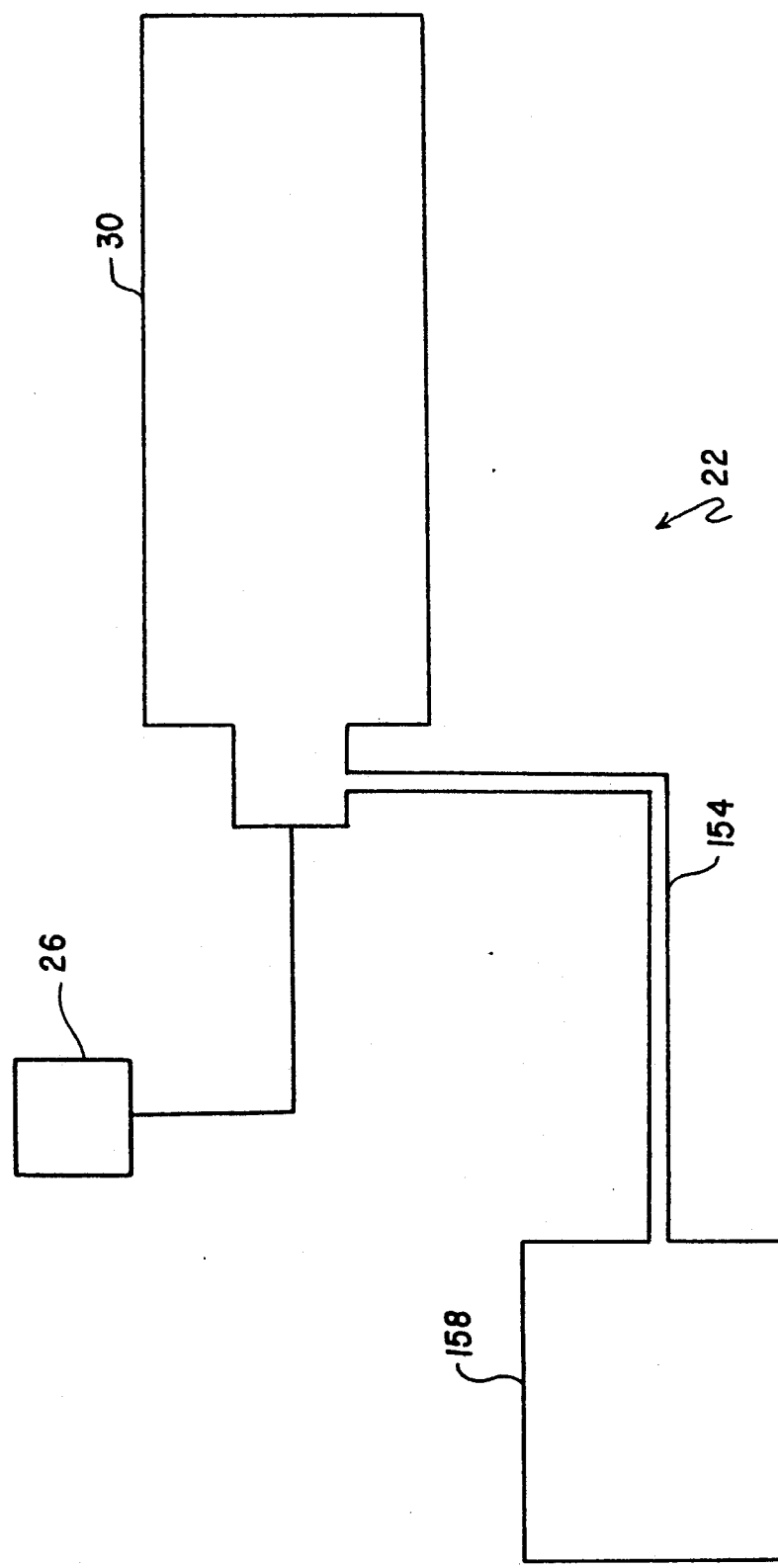
FIG. 1 is a block diagram of a typical inflatable safety system for motor vehicles.

Referring to FIG. 1, a typical inflatable safety system 22 is generally illustrated. The primary components of such an inflatable safety system 22 include a detector 26, an inflator 30, and an expandable confinement 158. When the detector 26 senses a condition requiring expansion of the confinement 158, a signal is sent to the inflator 30 to release gases or other suitable fluids from the inflator 30 to the confinement 158 via the conduit 154. Although one particular type of inflator 30 will be described herein, it will be appreciated that the present invention may be used with a wide variety of inflators 30, including those which only contain a source of pressurized gas or other fluid, those which utilize a source of pressurized gas in combination with a propellant which is ignited at some point during inflation to augment the flow, or those systems which utilize only the ignition and subsequent combustion of a propellant to expand the confinement 158.

Figure 2:
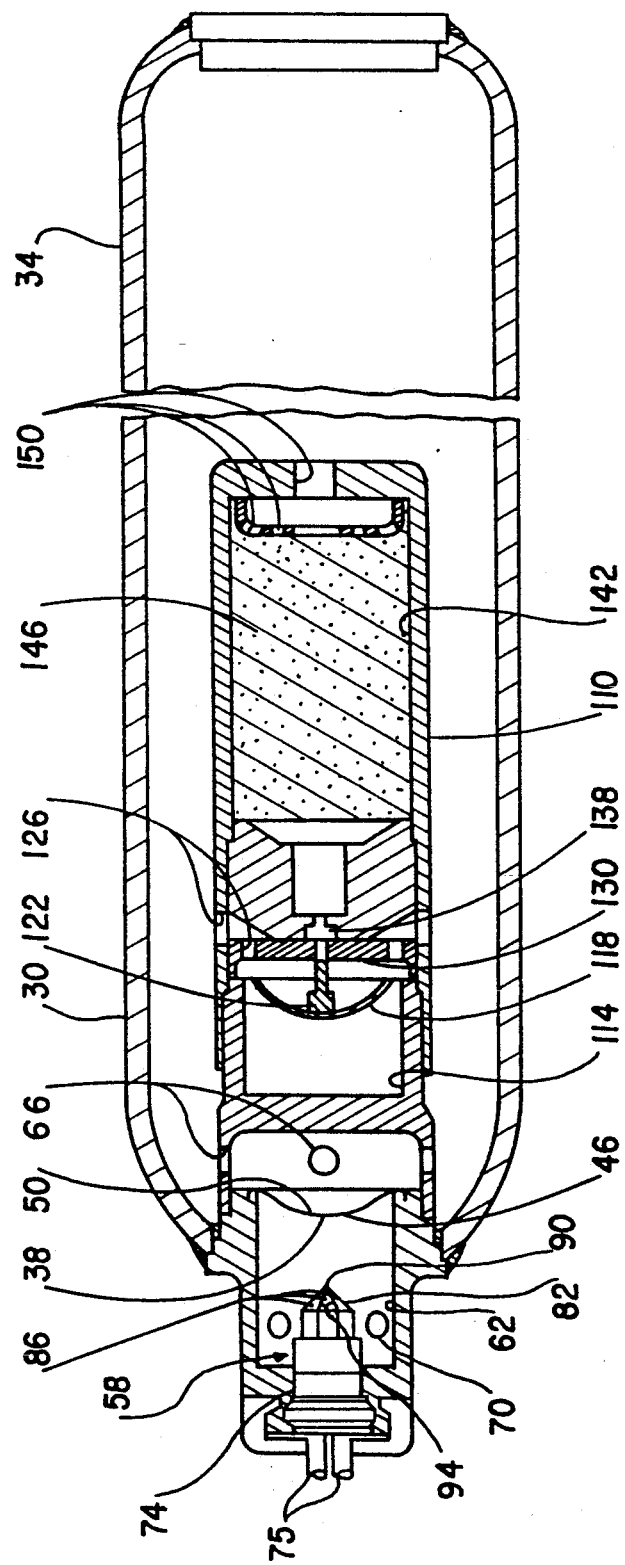
FIG. 2 is a longitudinal cross-sectional view of one type of inflator with which the present invention may be utilized.

One embodiment of an inflator 30 with which the present invention may be used is illustrated in FIG. 2. Generally, the inflator 30 includes a stored gas housing 34 which contains a source of pressurized gas, a pressurized, dome-shaped isolating disk 38 which contains the gas within the stored gas housing 34 until a condition requiring inflation is sensed by the detector 26 (FIG. 1), an activator assembly 58 which effects the release of the gas from the stored gas housing 34 by separating the disk 38 in a controlled manner (discussed in detail below) to initiate flow to the confinement 158 (FIG. 1), and a gas generator 110 which augments the flow to the confinement 158 (FIG. 1) after the initial expansion thereof by ignition and subsequent combustion of a propellant 146 contained therein.

In operation of the inflator 30 of FIG. 2, the detector 26 (FIG. 1) will sense a condition requiring operation of the inflatable safety system 22 and thereafter send a signal through the leads 78 to the activation assembly 58 which is positioned in close proximity to the disk 38. The activation assembly 58 includes an electroexplosive device 74 having a projectile 82 appropriately attached thereto. Upon receipt of this signal, the electroexplosive device 74 propels the projectile 82 toward the disk 38 to penetrate and separate the disk 38 in a controlled manner (discussed below) to allow to begin flowing from the stored housing 34, through the interior discharge ports 66, the discharge connector 62, the exterior discharge ports 70, the conduit 154, and into the confinement 158. Due to the effective diameter of the projectile 82, it is unable to pass through the exterior discharge ports 70 and is thus retained within the inflator 30 during inflation.

A gas generator 110 is coaxially positioned within the stored gas housing 34 to augment the flow to the confinement 158 after having been initially expanded by the flow of pressurized gas from the stored gas housing 34. This augmented flow is initiated in response to certain changing conditions, one of which is a change in pressure, and thus the inflator 30 utilizes a reference chamber 114 having a pressurized gas contained therein by a cup-shaped, bistable diaphragm 118 which assists in activating a propellant 146 contained within a propellant chamber 142.

In its first position, the convex surface of the diaphragm 118 is exposed to the gas within the reference chamber 114 while its concave surface is exposed to the gas within the stored gas housing 34 via the plurality of pressure ports 126 positioned in the wall of the gas generator 110 and the divider 130 positioned between the diaphragm 118 and the propellant chamber 142. Consequently, as gas flows from the stored gas housing 34 to the confinement 158 after the above-described controlled separation of the disk 38 by the projectile 82, the pressure on the initial concave surface of the diaphragm 118 decreases in relation to the pressure within the reference chamber 114 which continues to exert forces on the convex surface of the diaphragm 118. After a certain differential pressure develops, the diaphragm 118 rapidly inverts into its second position (i.e., the convex surface now faces the propellant chamber 142) to propel an impacting mass 122 into engagement with a percussion primer 138 to ignite the propellant 146. The propellant gases generated by the combustion of the propellant 146 then exit the propellant chamber 142 through the gas generator ports 150 to augment the flow to the confinement 158 through the above described passageways.

An important aspect of the present invention is the controlled separation of the disk 38 in a manner which not only allows for a sufficient, timely flow from the inflator 30 to the confinement 158 (FIG. 1), but which allows the disk 38 to remain substantially intact to significantly reduce the amount of foreign materials which are generated upon activation of the inflator 30. The configuration of the projectile 82 contributes to this controlled separation of the disk 38 and embodiments of the projectile 82 are illustrated in FIGS. 3-8. Although the disk 38 is illustrated as being dome-shaped in FIGS. 2, 9-10, and 15, the advantages of which will be discussed below, other configurations may be appropriately separated by the projectile 82 in the desired controlled manner.

Figure 3:
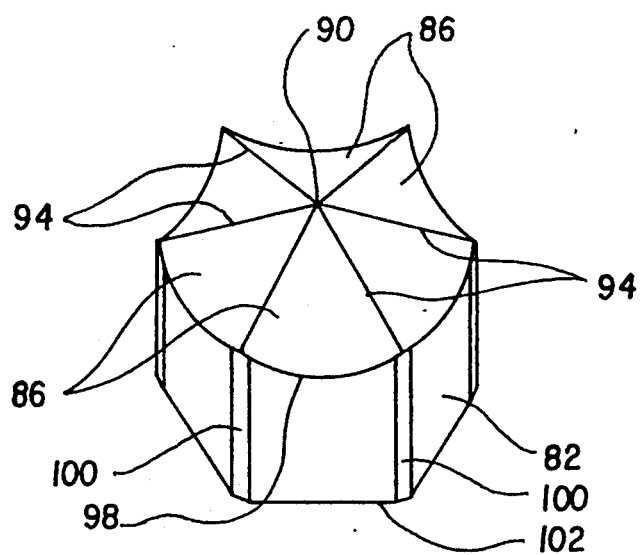
FIG. 3 is a perspective view of one embodiment of a projectile.
Figure 4:
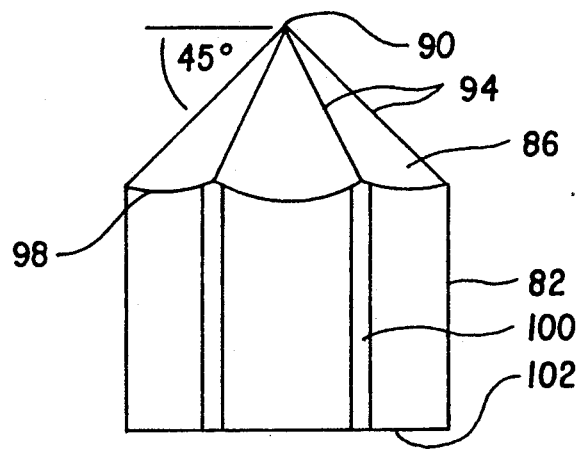
FIG. 4 is a side view of the projectile of FIG. 3.
Figure 5:
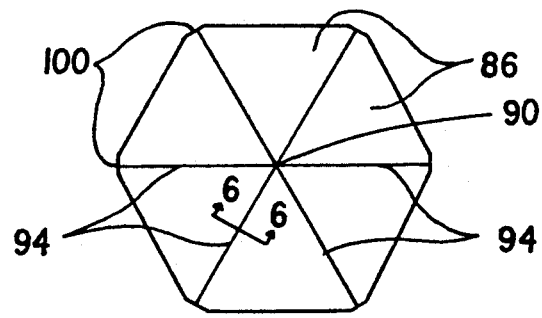
FIG. 5 is a top view of the projectile of FIG. 3.
Figure 6:
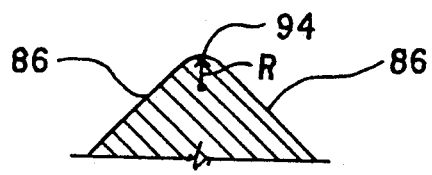
FIG. 6 is a partial cross-sectional view of one embodiment of the projectile of FIG. 5 taken along line 6—6.
Figure 11:
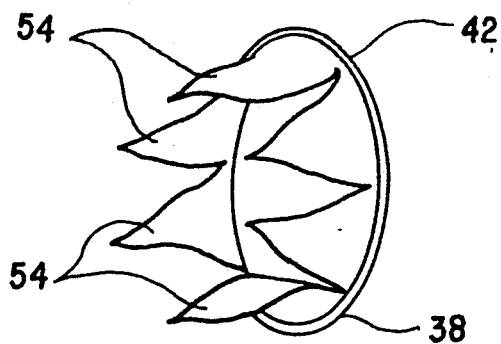
FIG. 11 is a perspective view of the isolating disk of FIG. 9 after one embodiment of the projectile has passed therethrough.
Figure 12:
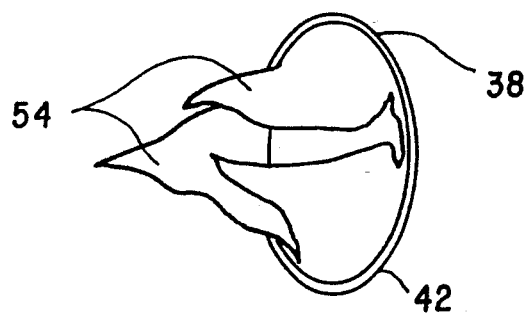
FIG. 12 is a perspective view of the isolating disk of FIG. 9 after another embodiment of the projectile has passed therethrough.
Figure 15:
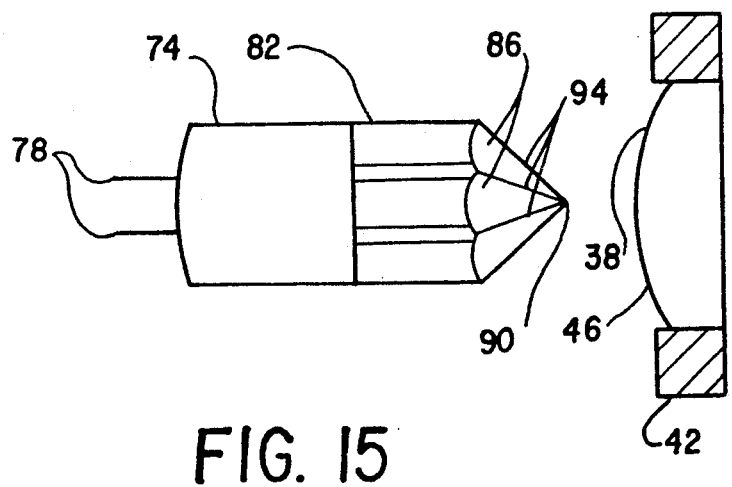
FIG. 15 is a side view of one embodiment of a projectile prior to being propelled toward the isolating disk of FIG. 9.

Specifically referring to FIGS. 3-5, the projectile 82 includes a plurality of inclined, intersecting faces 86 which converge to a point at the tip 90 of the projectile 82. The intersection of these faces 86 thereby define a plurality of edges 94 which are used to initiate separation of the disk 38 along lines coinciding with the edges 94. As will be discussed in more detail below, preferably each face 86 is of substantially the same size and configuration, resulting in the edges 94 being substantially equally spaced to separate the disk 38 into substantially equally-sized petals 54, each of which remain attached to a rim 42 positioned on the perimeter of the disk 38 and which point in the direction of the flow as illustrated in FIGS. 11-12 and 15.

The pointed tip 90 allows the projectile 82 to effectively penetrate the disk 38 without removing any significant material portions thereof (i.e., no significant portion of the disk 38 is punched out and separated from remaining portions of the disk 38 by the penetrating projectile 82). As the projectile 82 advances through the disk 38, the edges 94 cut the disk 38 along lines coinciding with the edges 94. This cutting action is achievable since the projectile 82 tapers outwardly from its tip 90 to the base 98 (i.e., the effective diameter of the projectile 82 increases from the tip 90 to the base 98). Moreover, each edge 94 possesses a sufficient "sharpness" to cut or shear the pressurized disk 38 along lines coinciding with the edges 94. This is a primary requirement in achieving controlled separation of the disk 38 to produce a consistent end configuration thereof which will remain substantially intact throughout operation of the inflator 30 so as to not adversely affect the performance thereof by introducing fragments or other foreign materials into the flow. The cutting or shearing of the disk 38 is greatly enhanced by the high stress level in the disk 38 due to pressure of the gas on the concave side 50 of the disk 38.

As a general rule of manufacturing process, the thickness of a piece of metal stock determines, in part, the radius of a bend which may be formed without cracking or shearing the stock. When the radius of a bend for a piece of metal stock becomes much smaller than the initial thickness of the stock, the potential for the development of cracks in the bend or the actual shearing of the stock in this region increases. Consequently, if it is desirable to achieve a cutting or shearing action in this region, the stock should be bent at a radius which is much less than its thickness. The thickness of a typical disk 38 used by inflators 30 of the type described herein is approximately 0.010 inch. Therefore, based upon the foregoing general rule, the radius "R" defined by the intersection of the faces 86 of the projectile 82 which defines an edge 94, best illustrated in FIG. 6, should be less than 0.010 inch in order to achieve the desired cutting action. However, in order to ensure that the desired cutting or shearing action is achieved in these regions, the radius R should be significantly less than the thickness of the disk 38, and in this case the radius R should thus preferably be less than 0.002 inch.

Figure 7:
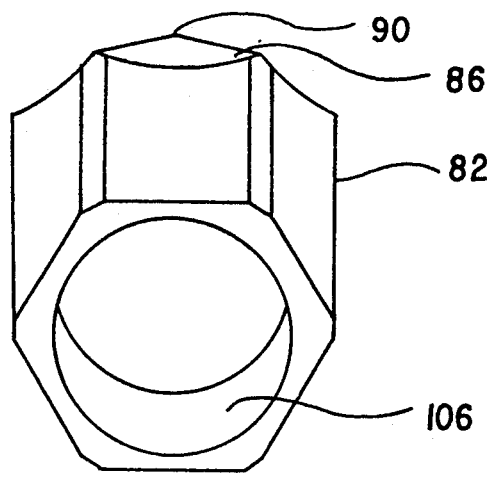
FIG. 7 is a second perspective view of the projectile of FIG. 3 from the bottom portion thereof.

In order to enhance the definition of the edges 94 on the projectile 82, the faces 86 may have a certain degree of concavity as best illustrated in FIGS. 3, 4, and 7, although such concavity is not necessarily required (i.e., the edges 94 may already have a sufficiently small radius to produce the desired cutting action described above). The faces 86 taper downwardly from the edges 94 to produce the desired concavity. Consequently, the edges 94 are in essence "raised" to enhance separation of the disk 38 by producing a more effective cutting action. As can be appreciated, although a certain increased definition of the edges 94 will enhance the controlled separation of the disk 38 along the predetermined lines defined thereby, the point may be reached where such definition will undesireably increase the potential for portions thereof to break off from the remainder of the projectile 82 when passing through the disk 38.

Figure 13:
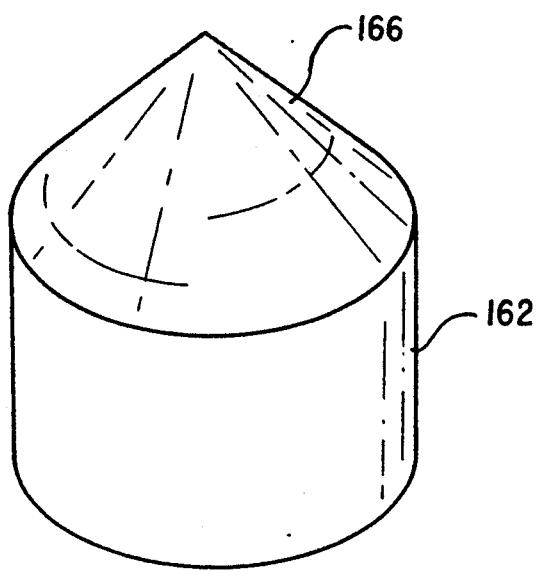
FIG. 13 is a perspective view of a projectile having a pointed tip and a smooth surface over the taper forming the tip.
Figure 17:
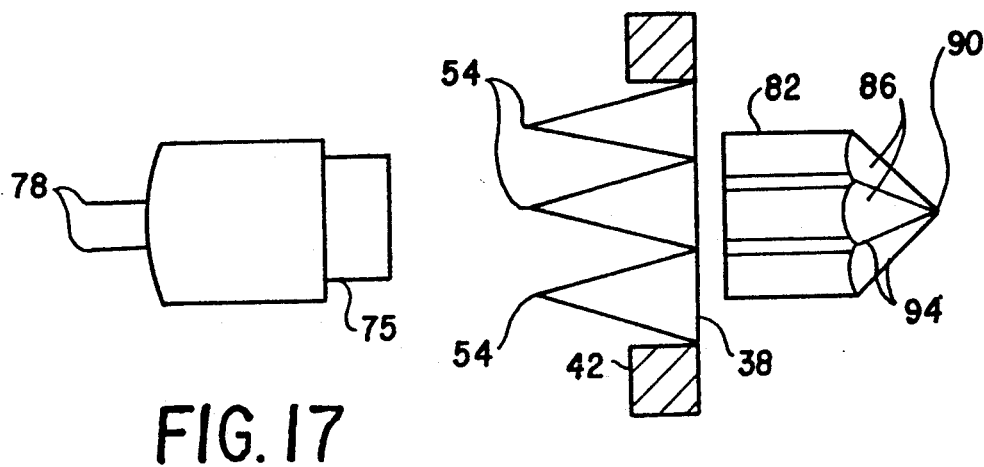
FIG. 17 is a side view of one embodiment of the projectile after it has completely penetrated and passed through the isolating disk of FIG. 9.

For purposes of comparison with the projectile 82 of FIGS. 3-8 and its configuration which allows for controlled separation of the disk 38 by the cutting or shearing thereof along predetermined lines, consider the conical projectile 162 of the type illustrated in FIG. 13 which is unable to consistently produce an end configuration of a disk 38 similar to that illustrated in FIGS. 11-12 and 17. The radius of the smooth, tapered surface 166 of the conical projectile 162 does not approach that which will induce shearing of the disk 38 in the region of the bend based upon the above-discussed principles of bending (i.e., the radius of the tapered surface is not sufficiently small to shear the disk 38 along predetermined lines). As the conical projectile 162 passes through the disk 38, the bending thereof will cause the disk 38 to tear along lines which coincide, in part, with the stresses within the disk 38, which may vary from case to case dependent upon a number of factors. An expected typical end configuration of a disk 38 using the conical projectile 162 is thus illustrated in FIG. 14. As is evident by the configuration of the disk 38 in FIG. 14, the results are essentially unpredictable and there then exists a potential for portions of the barrier 38 breaking off and entering the flow from the inflator 30.

Although the "sharpness" of each edge 94 of the projectile 82 is important to achieving the desired cutting action to produce a controlled separation of the disk 38, there are other contributing factors. For instance, the degree of the taper of the edges 94, as defined by the angle of inclination of the faces 86, affects the cutting action. In one embodiment, the faces are inclined at an angle of 45° relative to the longitudinal axis of the projectile 82 (or 45° relative to a horizontal plane touching the tip 90 as illustrated in FIG. 4) to provide an effective cutting action. Although the length of the edges 94 is directly affected by this angulation and the effective diameter of the projectile 82, the required length is more a function of the diameter of the disk 38 to be separated (discussed below), but it is nonetheless desirable for the length of each edge 94 to be substantially equal. In addition, the edges 94 of the projectile 82 should completely extend to the base 98 of the projectile 82 and maintain the above-described "sharpness" over the entire length thereof to in effect abruptly end the cut (although it may be continued by other forces as discussed below). Any rounding off of the edges 94 before reaching the base 98 of the projectile 82 will potentially result in an uncontrolled tearing of the disk 38 after the projectile 82 passes therethrough to increase the potential for the breaking off of portions thereof.

The projectile 82 should also be configured from its base 98 to its bottom 102 so as to not interfere with the separation lines produced by the edges 94 (i.e., the base 98 should substantially linearly connect the ends of the edges 94 such that if there are six edges 94, the projectile 82 will be substantially hexagonal). It may also be necessary or desirable to flatten out portions 100 of the projectile 82. Furthermore, the hardness of the projectile 82 and its edges 94 should preferably be quantitatively greater than that of the disk 38 to ensure the desired cutting action is achieved. Since a typical disk 38 is made from inconel 625, one suitable material for the projectile 82 is stainless steel.

When the above-described configuration of the projectile 82 penetrates and passes through a substantially circular disk 38, the cutting action produces an end configuration of a disk 38 which has a number of triangularly-shaped petals 54, which remain attached to the rim 42 of the disk 38, and which coincide with the number of edges 94 and faces 86 of the projectile 82 as illustrated in FIGS. 11–12 and 17. For instance, if the projectile 82 has six similarly sized faces 86, the separated disk 38 will consistently have six similarly sized petals 54 as illustrated in FIG. 11, whereas if the projectile 82 has three similarly sized faces 86, the separated disk 38 will consistently have three similarly sized petals 54 as illustrated in FIG. 12.

The resultant number of petals 54 into which the disk 38 is separated directly affects the desired reduction in potential for portions of the disk 38 breaking off and entering the flow. For instance, as the number of petals 54 decreases, there is naturally a corresponding increase in their individual size. Consequently, the "width" of the base of these petals 54 where they remain attached to the rim 42 of the disk 38 also increases. When this base width of the petals 54 increases to a certain degree, the point may be reached where the material stresses in this region may promote an uncontrolled tearing of the disk 38. As a result, portions of the disk 38, although initially separated in a controlled manner by the projectile 82, may tear or break off because of these stresses and subsequently enter the flow from the inflator 30.

Figure 14:
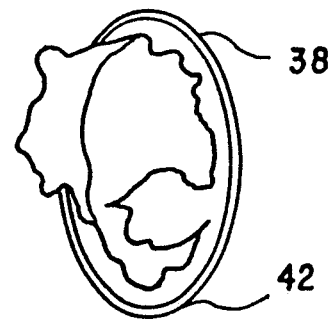
FIG. 14 is a perspective view of the isolating disk of FIG. 9 in an expected configuration after the projectile of FIG. 13 has passed therethrough.

Increasing the number of petals 54 reduces the individual size thereof and thus the "width" of the petals 54 where attached to the rim 42 of the disk 38, which thus also reduces stresses in the disk 38 in these regions. However, as the number of petals 54 is increased, the point may be reached where the base of the petals 54 becomes sufficiently small such that individual petals 54 may break or be torn off by the flow from the inflator 30. Moreover, the point will be reached where the plurality of intersecting faces 86 will approach a smooth surface such as possessed by the conical projectile 162 illustrated in FIG. 13. (i.e., the radius R (FIG. 6) of the edges 94 will increase such that the desired cutting action will not be achievable due to the above-discussed bending principles). Consequently, the disk 38 will tear in a manner dictated not by the cutting action of the edges 94, but primarily by the stresses in the disk 38 generated by the bending action of the projectile 82, thereby increasing the potential for portions thereof to break or tear off and enter the flow. Again, an expected end configuration of a disk 38 after a projectile 82 possessing too many edges 94 which approaches the configuration of the conical projectile 162 of FIG. 13 has passed therethrough is illustrated in FIG. 14.

Based upon the foregoing, in order to achieve the desired cutting action to consistently produce an end configuration of a disk 38 which will not introduce any significant amounts of material into the flow, the number of faces 86 and thus edges 94 for the projectile 82 could range from 4–10, and preferably should range from 5–8. A hexagonal projectile 82 (i.e., six faces 86) has produced particularly desirable results.

Figure 8:
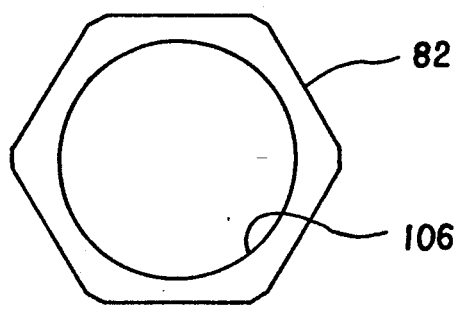
FIG. 8 is a bottom view of the projectile of FIG. 3.
Figure 16:
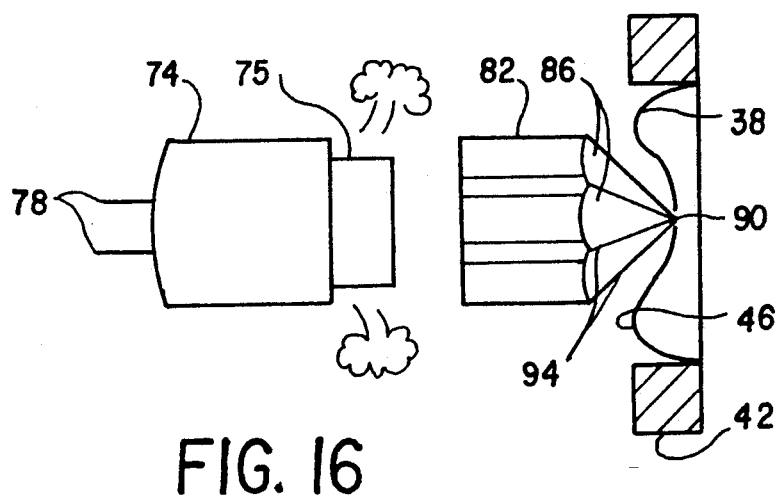
FIG. 16 is a side view of one embodiment of the projectile as it initially contacts and pierces the isolating disk of FIG. 9.

The projectile 82 of the described configuration is propelled toward the disk 38 to produce the desired controlled separation thereof. In this regard, the projectile 82 is initially attached to the end of the electroexplosive device 74 as best illustrated in FIGS. 2 and 15. Numerous methods may be used to attach the projectile 82 to the electroexplosive device 74 such as by molding, crimping, or using an adhesive. When the detector 26 (FIG. 1) senses a condition requiring expansion of the confinement 158 (FIG. 1), the electroexplosive device 74 (FIGS. 2 and 15) is activated to propel the projectile 82, without the use of an external guide or other similar bore, toward the disk 38 (FIGS. 2 and 16). Since an external guide is not used, the projectile 82 may have a cavity 106 positioned on its bottom 102 such that the forces of the electroexplosive device 74 are concentrated thereon as best illustrated in FIGS. 7–8. In order to enhance this desired concentration of forces, an extension 75 of the electroexplosive device 74 which contains, for instance, black powder, may fit within the cavity 106 of the projectile 82 (FIGS. 7–8). Consequently, the need for a separate external guide, which increases material costs and which may require further structural considerations, is eliminated. Instead, the projectile 82 motion is initially guided by the fit of the cavity 106 of the projectile 82 over the extension 75 of the electroexplosive device 74.

Figure 9:
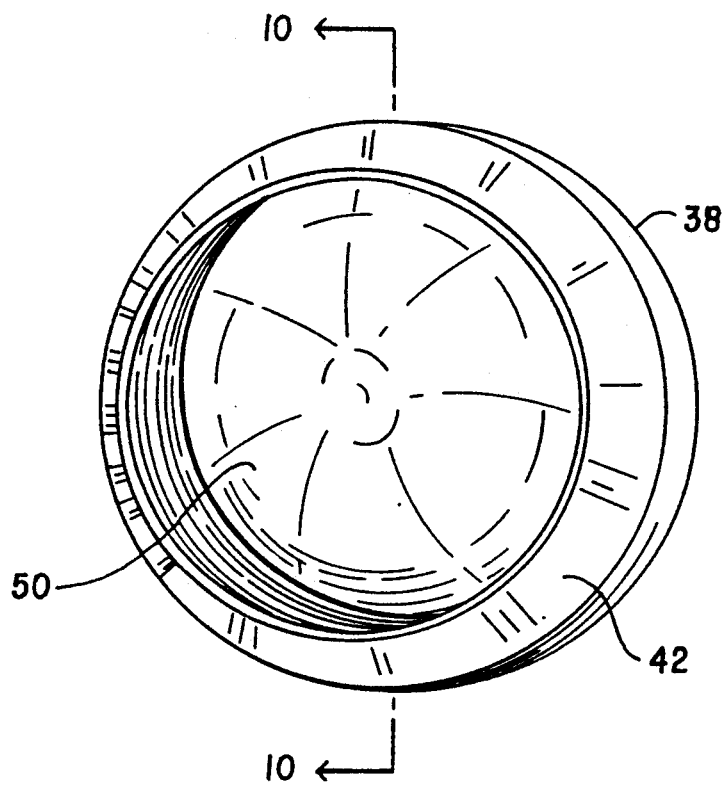
FIG. 9 is a perspective view of a preferred configuration of an isolating disk useful with the present invention.
Figure 10:
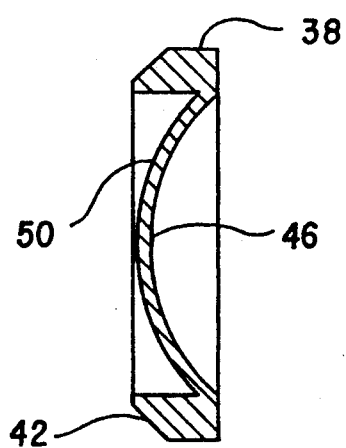
FIG. 10 is a cross-sectional view of the disk of FIG. 9 along line 10—10.

The configuration of the disk 38 also contributes to the controlled separation by the projectile 82. A dome-shaped disk 38 which has a concave side 46 and a convex side 50 may be used to achieve similar results as best illustrated in FIGS. 9–10 and as generally illustrated in FIGS. 2 and 15. Preferably, the concave side 46 is exposed to the gas within the stored gas housing 34 (FIG. 2) while the convex side 50 is positioned to face the projectile 82 (FIG. 2). This particular configuration offers a number of advantages in reducing the number of fragments generated upon release of the gas from the stored gas housing 34 and in permitting the electroexplosive device 74 with its attendant lead wires 76 to be positioned outside the pressurized compartment of the stored gas housing 34.

Referring to FIGS. 15–17, the disk 38 will initially be in a stressed condition due to the exertion of forces on the concave side 46 thereof by the pressurized gas within the stored gas housing 34 (FIG. 2). When the projectile 82 is propelled toward and initially contacts the disk 38, the disk 38 will "dimple" in as illustrated in FIG. 16 and begin to "pierce" the disk 38. This dimpling of the disk 38 further increases the stresses therewithin. When the disk 38 is penetrated by the projectile 82, these stresses are released and assist in the separation of the disk 38 along the lines defined by the edges 94 of the projectile 82 (i.e., the desired cutting action is enhanced). Further contributing to the controlled separation of the disk 38 along these lines is the flow of gas from the stored gas housing 34. Consequently, the end result is a plurality of petals 54 of substantially similar size which point in the direction of the flow which further reduces the potential for portions thereof breaking off and entering the flow from the inflator 30 as illustrated in FIG. 17.

When using a disk 38 of the above described "dome-shaped" configuration, the diameter of the projectile 82 need not necessarily be similar to that of the disk 38 to ensure that controlled separation thereof is achieved. For instance, due to the stresses in the disk 38 resulting from the above-described initial "dimpling" of the disk 38 from the projectile 82 and the forces exerted on the concave side 46 of the disk 38 by the gas from the stored gas housing 34, the edges 94 of the projectile 82 do not have to cut the disk 38 all the way to the rim 42 to achieve full separation. As long as the controlled cut has reached a certain distance, these other forces will complete the separation of the disk 38 in a controlled manner without significantly increasing the risk for portions thereof breaking off. In fact, the diameter of the projectile 82 may be approximately one-half of that of the disk 38 without generating or undesirably increasing the potential for generating any significant amount of fragments.

In operation of the present invention when incorporated into an inflatable safety system 22 of the type illustrated in FIGS. 1-2, the detector 26 will send a signal to the electroexplosive device 74 when activation of the inflatable safety system 22 is required. After the electroexplosive device 74 receives the signal, the projectile 82 is propelled through the disk 38 to achieve the above-desired results. When a hexagonally configured projectile 82 has been initially positioned approximately ¼" from the disk 38 and propelled toward the disk 38 at an initial velocity ranging from 500-600 feet/second, particularly desirable results have been obtained. Thereafter, gas will flow from the stored gas housing 34 into the confinement 158 without any significant amount of foreign materials therein which could adversely affect performance of the inflatable safety system 22. Moreover, since the diameter of the projectile 82 is greater than that of the individual interior and exterior discharge ports 66, 70, the projectile 82 will be retained within the inflator 30 during operation so as to not enter the confinement 158.

The foregoing description of the invention has been presented for purposes of illustration and description. Further, the description is not intended to limit the invention to the form disclosed herein. Consequently, variations and modifications commensurate with the above teachings, and the skill or knowledge of the relevant art, are within the scope of the present invention. The embodiments described hereinabove are further intended to explain best modes known of practicing the invention and to enable others skilled in the art to utilize the invention in such, or other, embodiments and with the various modifications required by the particular applications or uses of the invention. It is intended that the appended the claims be construed to include alternative embodiments to the extent permitted by the prior art.

What is claimed is:

1. An inflator apparatus, comprising:
   first means for containing pressurized gas;
   second means for providing a barrier to the escaping of pressurized gas; and
   third means for causing said second means to rupture to permit flow of pressurized gas from said first means, said third means including a projectile having a plurality of faces and means for moving said projectile, wherein when said projectile is caused to move by said means for moving, said projectile passes through said second means, wherein substantially all of said second means remains together, substantially no fragments of said second means are produced, and said second means has a number of petals, the number of said petals depending upon the number of said faces.

2. An apparatus, as claimed in claim 1, wherein said projectile includes a head having said plurality of faces and a plurality of boundary edges, in which each said boundary edge defines a boundary between two of said faces.

3. An apparatus, as claimed in claim 2, wherein each of said boundary edges is defined by a radius and said radius is substantially less than the thickness of a portion of said second means through which said projectile passes.

4. An apparatus, as claimed in claim 2, wherein each of said boundary edges is substantially straight.

5. An apparatus, as claimed in claim 2, wherein said projectile head includes a tip that is substantially a point, wherein said point and said boundary edges provide a cutting action when said projectile passes through said second means.

6. An apparatus, as claimed in claim 2, wherein each of said faces is substantially equal in size to the other of said faces and said boundary edges and said faces converge to a tip that is substantially a point.

7. An apparatus, as claimed in claim 2, wherein each of said faces is concave.

8. An apparatus, as claimed in claim 2, wherein the number of said faces is greater than three and less than eleven.

9. An apparatus, as claimed in claim 3, wherein said thickness of said second means portion is in the range of 3-10 times greater than the magnitude of said radius.

10. An apparatus, as claimed in claim 1, wherein said projectile moves freely from a portion of said third means to said second means when said projectile is caused to move, whereby said projectile is not constrained by any guide positioned between said third means and said second means.

11. An apparatus, as claimed in claim 1, wherein said second means includes a disk having a convex side facing said projectile and a concave side on which pressurized gas acts.

12. An apparatus, as claimed in claim 11, wherein said disk is pre-stressed.

13. An apparatus, as claimed in claim 11, wherein said petals point in a direction generally opposite the direction that said projectile moves in passing through said second means.

14. An inflator apparatus, comprising:
   first means for containing pressurized gas;
   second means for providing a barrier to the escaping of pressurized gas, said second means having a convex side and a concave side; and
   third means for causing said second means to rupture to permit flow of gas from said first means, wherein said third means includes a single fourth means for engaging said second means, positioned on said convex side of said seconds means, and a fifth means for passing said fourth means through said second means, said second means having a number of petals that are created by said fourth means passing through said second means, with said petals facing in a direction opposite the direction of movement of said fourth means when said fourth means passes through said second means.

15. An apparatus, as claimed in claim 14, wherein said convex side is pre-stressed.

16. An apparatus, as claimed in claim 14, wherein said fourth means includes a head having a plurality of faces, with a boundary edge being defined between each of said faces.

17. An apparatus, as claimed in claim 16, wherein said second means has a thickness and wherein each of said boundary edges is defined by a radius which is substantially less than said thickness of said second means through which said fourth means passes.

18. An apparatus, as claimed in claim 16, wherein each of said faces is substantially the same size as the other of said faces.

19. An apparatus for expanding an inflatable confinement, comprising:
   first means for containing a source of fluid;
   barrier means, positioned between said first means and the inflatable confinement, for retaining said fluid in said first means, wherein said barrier means is dome-shaped and has a convex side and a concave side, said concave side facing the source of fluid;
   projectile means, positioned on said convex side of said barrier means, for engaging said barrier means; and
   ignition means for propelling said projectile means through said barrier means, wherein said projectile means penetrates said barrier means and separates portions of said barrier means along lines determined by said projectile means, said barrier means being separated into a plurality of substantially equally-sized portions when said projectile means passes therethrough.

20. An apparatus, as claimed in claim 19, wherein said projectile means has a plurality of intersecting, inclined faces which converge to substantially a point.

21. An apparatus, as claimed in claim 20, wherein the intersection of said plurality of faces defines a plurality of cutting edges which separate said barrier means along lines coinciding therewith.

22. An apparatus, as claimed in claim 20, wherein the number of said faces ranges from four to ten.

23. An apparatus, as claimed in claim 19, wherein a maximum diameter of said projectile means is less than the diameter of said barrier means.

24. An apparatus, as claimed in claim 19, wherein a maximum diameter of said projectile means is less than three-fourths the diameter of said barrier means.

25. An apparatus, as claimed in claim 19, wherein said ignition means applies a force to a cavity portion on said projectile means to freely propel said projectile means toward said barrier means.

26. An apparatus, as claimed in claim 19, wherein said portions are substantially triangular in shape and taper to a point, wherein the points of said portions coincide with the direction of the flow of fluid from said first means.

27. An apparatus, as claimed in claim 19, wherein said separation lines on said barrier means are related to the contour of said projectile means.

28. An apparatus, as claimed in claim 19, wherein said projectile means initiates said separation lines on said barrier means and the stresses created in said barrier means by the initial contacting of said projectile means and the flow of fluid from said first means completes the separation of said barrier means along said separation lines.

29. A method for permitting gas flow in an inflator apparatus, comprising:
   propelling a projectile towards a barrier means, said barrier means having a perimeter portion and retaining a supply of gas;
   impacting said projectile on an interior portion of said barrier means relative to said perimeter portion;
   rupturing said barrier means generally form said interior portion toward said perimeter portion for permitting a flow of said gas using said projectile while substantially all portions of said barrier means remain together so that substantially no fragments of said barrier means are created, said step of rupturing including having substantial portions of said barrier means face in the direction from which said projectile moves toward said barrier means, said perimeter portion of said barrier means remaining substantially stationary during said rupturing step.

30. A method, as claimed in claim 29, wherein:
said step of rupturing includes creating petals in said barrier means, each of said petals being substantially the same size.

31. A method, as claimed in claim 30, wherein:
the number of said petals depends upon the number of faces of said projectile.

32. A method, as claimed in claim 30, wherein:
said step of rupturing includes using gas flow to move said petals in said direction opposite the direction of said projectile movement.

33. A method, as claimed in claim 29, wherein:
said step of rupturing includes cutting said barrier means using a head of said projectile.

34. An inflator apparatus, comprising:
first means for containing pressurized gas;
second means for providing a barrier to the escaping of pressurized gas; and
third means for causing said second means to rupture to permit flow of pressurized gas from said first means, said third means including a projectile and a means for moving said projectile, said projectile comprising:
   a head having a plurality of faces and a plurality of boundary edges, each said boundary edge defining a boundary between two of said faces, wherein each of said boundary edges is defined by a radius, said radius being substantially less than the thickness of a portion of said second means through which said projectile passes;
   wherein when said projectile is caused to move by said means for moving, said projectile passes through said second means, whereby substantially all of said second means remains together and substantially no fragments of said second means are produced.

35. An apparatus, as claimed in claim 34, wherein said thickness of said second means portion is in the range of 3–10 times greater than the magnitude of said radius.

36. An inflator apparatus, comprising:

fist means for containing pressurized gas;

second means for providing a barrier to the escaping of pressurized gas; and third means for causing said second means to rupture to permit flow of pressurized gas from said first means, said third means including a projectile and a means for moving said projectile, said projectile comprising:

a head having a plurality of faces and a plurality of boundary edges, each said boundary edge defining a boundary between two of said faces, wherein each of said faces is substantially equal in size to the other of said faces and said boundary edges and said faces converge to a tip that is substantially a point;

wherein when said projectile is caused to move by said means for moving, said projectile passes through said second means to provide an opening in said second means which has a diameter which is at least as great as a diameter of said projectile, said projectile being substantially free from any angular displacement relative to a longitudinal axis of said projectile when providing said opening, whereby substantially all of said second means remains together and substantially no fragments of said second means are produced.

37. An inflator apparatus, comprising:

first means for containing pressurized gas;

second means for providing a barrier to the escaping of pressurized gas; and third means for causing said second means to rupture to permit flow of pressurized gas from said first means, said third means including a projectile and a means for moving said projectile, said projectile comprising:

a head having a plurality of faces and a plurality of boundary edges, each said boundary edge defining a boundary between two of said faces, wherein the number of said faces is greater than three and less than eleven;

wherein when said projectile is caused to move by said means for moving, said projectile passes through said second means to provide an opening in said second means which has a diameter which is at least as great as a diameter of said projectile, whereby substantially all of said second means remains together and substantially no fragments of said second means are produced, said faces of said projectile being configured to provide said opening independent of any application of a force on said second means by pressurized gas.

38. An inflator apparatus, comprising:

first means for containing pressurized gas;

second means for providing a barrier to the escaping of pressurized gas, said second means including a disk having a convex side and a concave side, pressurized gas acting on said concave side; and third means for causing said second means to rupture to permit flow of pressurized gas from said first means, said third means including a projectile and a means for moving said projectile, said convex side of said second means facing said projectile;

wherein when said projectile is caused to move by said means for moving, said projectile passes through said second means, whereby substantially all of said second means remains together and substantially no fragments of said second means are produced.

39. An apparatus as claimed in claim 38, wherein said disk is pre-stressed.

40. An apparatus, as claimed in claim 38, wherein said second means has a number of petals that are created by said projectile passing through said second means, with said petals facing in a direction opposite the direction that said projectile moves in passing through said second means.

41. A method for permitting gas flow in an inflator apparatus, comprising:

propelling a projectile towards a barrier means, said barrier means retaining a supply of gas;

rupturing said barrier means using said projectile to permit a flow of gas while substantially all portions of said barrier means remain together so that substantially no fragments of said barrier means are created, said step of rupturing including creating petals in said barrier means, each of said petals being substantially the same size, said step of rupturing including using gas flow to move said petals in said direction opposite the direction of said projectile movement.

42. A method, as claimed in claim 41, wherein the number of said petals depends upon the number of faces of said projectile.

43. An inflator apparatus, comprising:

first means for containing pressurized gas;

second means for providing a barrier to the escaping of pressurized gas, said second means having a thickness and a convex side and a concave side;

third means for causing said second means to rupture to permit flow of gas from said first means, wherein said third means includes a single fourth means for engaging said second means and a fifth means for passing said fourth means through said second means, wherein said fourth means is positioned on said convex side of said second means and includes a head having a plurality of faces, with a boundary edge being defined between each of said faces and each of said boundary edges being defined by a radius which is substantially less than said thickness of said second means through which said fourth means passes.

44. An apparatus for expanding an inflatable confinement, comprising:

first means for containing a source of fluid;

barrier means, positioned between said first means and the inflatable confinement, for retaining said fluid in said first means, wherein said barrier means is domed-shaped and has a convex side and a concave side, said concave side facing the source of fluid;

projectile means, positioned on said convex side of said barrier means, for engaging said barrier means; and ignition means for propelling said projectile means through said barrier means, said ignition means applying a force to a cavity portion on said projectile means to freely propel said projectile means toward said barrier means, wherein said projectile means penetrates said barrier means and separates portions of said barrier means along lines determined by said projectile means.

45. A method for permitting gas flow in an inflator apparatus, comprising:

propelling a projectile toward a barrier means, said barrier means retaining a supply of gas;

rupturing said barrier means using said projectile to permit a flow of gas while substantially all portions of said barrier means remain together so that substantially no fragments of said barrier means are created, said step of rupturing including creating petals in said barrier means, each of said petals being substantially the same size, wherein the number of said petals depends upon the number of faces of said projectile.

* * * * *